(12) United States Patent
Choi (10) Patent No.: US 9,797,477 B2
(45) Date of Patent: Oct. 24, 2017

(54) POWER TRAIN FOR HYBRID VEHICLE

(71) Applicant: Hyundai Motor Company, Seoul (KR)

(72) Inventor: Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 180 days.

(21) Appl. No.: 14/661,516

(22) Filed: Mar. 18, 2015

(65) Prior Publication Data

US 2016/0091057 A1     Mar. 31, 2016

(30) Foreign Application Priority Data

Sep. 29, 2014  (KR) .......................... 10-2014-0130099

(51) Int. Cl.
| | |
|---|---|
| F16H 3/08 | (2006.01) |
| F16H 3/093 | (2006.01) |
| F16H 3/00 | (2006.01) |
| B60K 6/547 | (2007.10) |
| B60K 6/442 | (2007.10) |

(Continued)

(52) U.S. Cl.
CPC ............. *F16H 3/093* (2013.01); *B60K 6/442* (2013.01); *B60K 6/547* (2013.01); *B60W 10/06* (2013.01); *B60W 10/08* (2013.01); *B60W 10/113* (2013.01); *B60W 20/30* (2013.01); *F16H 3/006* (2013.01); *F16H 2003/0931* (2013.01); *F16H 2200/0056* (2013.01); *Y02T 10/6234* (2013.01); *Y02T 10/6286* (2013.01); *Y10S 903/902* (2013.01)

(58) Field of Classification Search
CPC .. F16H 3/006; F16H 2003/0931; F16H 3/091; F16H 47/02

USPC ........................... 74/330, 331, 333, 340, 661
See application file for complete search history.

(56) References Cited

U.S. PATENT DOCUMENTS

| | | | | |
|---|---|---|---|---|
| 6,634,247 | B2 * | 10/2003 | Pels ......................... | B60K 6/26 |
| | | | | 477/6 |
| 7,040,186 | B2 * | 5/2006 | Pollak .................... | B60K 17/34 |
| | | | | 180/240 |

(Continued)

FOREIGN PATENT DOCUMENTS

| | | |
|---|---|---|
| JP | 2007-113549 A | 5/2007 |
| JP | 2012-245877 A | 12/2012 |

(Continued)

*Primary Examiner* — Ha D Ho
(74) *Attorney, Agent, or Firm* — Morgan, Lewis & Bockius LLP (57) ABSTRACT

A power train for a hybrid vehicle may include a first transmission mechanism receiving a selective input of a power of an engine, and gear-shifting and transferring the power provided from the engine to a drive shaft through selection of engine-side gear mates that meet a traveling speed among a plurality of engine-side gear mates through a first control device, and a second transmission mechanism receiving an input of a power of a motor, and gear-shifting and transferring the powers provided from the engine and the motor to the drive shaft through selection of a motor-side gear mates that meet a traveling mode or the traveling speed among a plurality of motor-side gear mates through a second control device, wherein the second control device of the second transmission mechanism maintains one of the motor-side gear mates in a normally connected state to the drive shaft during traveling of the vehicle.

13 Claims, 8 Drawing Sheets

(51) Int. Cl.
*B60W 10/06* (2006.01)
*B60W 10/08* (2006.01)
*B60W 10/113* (2012.01)
*B60W 20/30* (2016.01)

(56) References Cited

U.S. PATENT DOCUMENTS

| | | | | |
|---|---|---|---|---|
| 7,166,059 | B2* | 1/2007 | Reitz | B60K 6/36 |
| | | | | 477/5 |
| 7,625,311 | B2* | 12/2009 | Dilzer | B60K 6/40 |
| | | | | 477/5 |
| 8,522,635 | B2* | 9/2013 | Pastorello | B60K 6/48 |
| | | | | 74/330 |
| 9,409,562 | B2* | 8/2016 | Choi | F16H 61/04 |
| 2011/0212801 | A1 | 9/2011 | Schrage | |

FOREIGN PATENT DOCUMENTS

| | | |
|---|---|---|
| JP | 2012-247018 A | 12/2012 |
| KR | 10-2013-0104387 A | 9/2013 |
| KR | 10-2013-0115618 A | 10/2013 |
| KR | 10-1417670 B1 | 7/2014 |

\* cited by examiner

<Third-stage traveling>

FIG. 4

<Gear shift from third stage to fourth stage>

FIG. 5

<Fourth-stage traveling>

FIG. 6

<Seventh-stage traveling>

FIG. 7

<R-stage traveling>

FIG. 8

POWER TRAIN FOR HYBRID VEHICLE

CROSS-REFERENCE(S) TO RELATED APPLICATIONS

The present application claims priority to Korean Patent Application No. 10-2014-0130099, filed on Sep. 29, 2014, which is incorporated herein by reference in its entirety.

BACKGROUND OF THE INVENTION

Field of the Invention

Exemplary embodiments of the present invention relate to a power train for a hybrid vehicle; and, particularly, to a power train for a hybrid vehicle, which can achieve high efficiency and improved gear shift quality through connection of a motor to a drive shaft of a front wheel, and can implement a gear ratio of an additional high-speed stage.

Description of Related Art

An AMT (Automated Manual Transmission) can provide driving convenience that is similar to that of an automatic transmission through an automatic gear shift by means of an actuator during driving of a vehicle, and can contribute to the improvement of the fuel efficiency of the vehicle through superior power transfer efficiency in comparison to the automatic transmission.

However, in the case of the AMT based on a synchromesh type transmission mechanism, discontinuity of an engine power may inevitably occur even while the gear shift is automatically performed by the actuator, and this may cause the occurrence of torque deterioration to accompany deterioration of the gear shift quality as if the vehicle was pulled in the rear direction.

Figure 1:
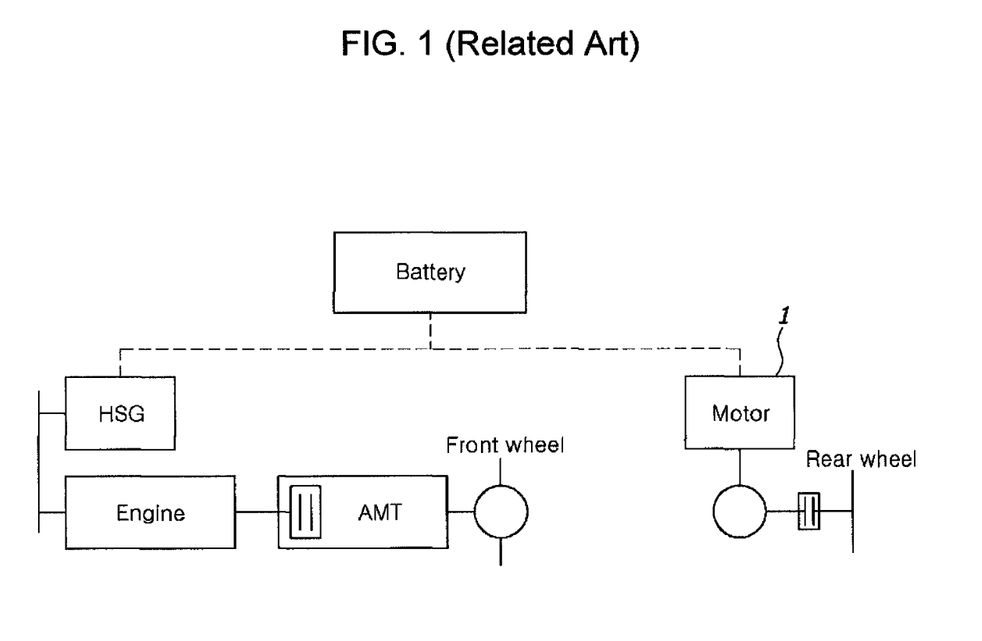
FIG. 1 is a diagram schematically illustrating the configuration of a hybrid transmission in the related art.

FIG. 1 illustrates the structure of a transmission in the related art to solve the above-described problem. According to this transmission structure, a transmission is configured on the basis of an AMT, and a motor 1 is mounted on a rear wheel.

That is, since the motor is directly connected to a drive shaft, torque is supplemented by the motor during the gear shifting, and thus the discontinuity of the gear shift quality can be prevented.

However, due to the characteristics of the structure in which the motor is mounted on the rear wheel, the breaking force of the rear wheel is relatively lower than the breaking force of the front wheel during a breaking operation, and the regenerative breaking ratio is decreased to lower the efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power train for a hybrid vehicle, which can achieve high efficiency and improved gear shift quality through connection of a motor to a drive shaft of a front wheel, and can implement a gear ratio of an additional high-speed stage.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a power train for a hybrid vehicle may include a first transmission mechanism receiving a selective input of a power of an engine, and gear-shifting and transferring the power provided from the engine to a drive shaft through selection of engine-side gear mates that meet a traveling speed among a plurality of engine-side gear mates having different gear ratios through a first control device, and a second transmission mechanism receiving an input of a power of a motor, and gear-shifting and transferring the powers provided from the engine and the motor to the drive shaft through selection of a motor-side gear mates that meet a traveling mode or the traveling speed among a plurality of motor-side gear mates having different gear ratios through a second control device, wherein the second control device of the second transmission mechanism maintains one of the motor-side gear mates in a normally connected state to the drive shaft during traveling of the hybrid vehicle.

A plurality of shifting rails are arranged to form a gear shift stage through selecting and shifting of corresponding gear mates through shifting movement of the first and second control devices, and a shifting rail for shifting movement of the second control device of the second transmission mechanism is configured to make one of the motor-side gear mates to be normally connected to the drive shaft in a neutral position of the shifting rail.

The second transmission mechanism may include a motor input shaft rotating by the power of the motor input thereto, a motor output shaft arranged in parallel to the motor input shaft, and the motor-side gear mates including low-stage gear mates and high-stage gear mates provided to be tooth-engaged with the motor input shaft and the motor output shaft with the different gear ratios, wherein the second control device selectively connects the low-stage gear mates or the high-stage gear mates to the drive shaft to transfer the power of the motor, and wherein the motor-side gear mates are connected to the drive shaft through the motor output shaft, and the motor-side mates that are connected to the motor output shaft by the second control device in the neutral position of the shifting rail are the low-stage gear mates.

The motor is directly connected to the motor input shaft.

A second final reduction pinion is provided on the motor output shaft, and the second final reduction pinion is provided to be tooth-engaged with a ring gear of the drive shaft.

When the shifting rail connected to the second control device of the second transmission mechanism is moved from the neutral position to a shifting position on a side, the low-stage gear mates are disconnected from the motor output shaft, and the high-stage gear mates are connected to the motor output shaft by the second control device.

The high-stage gear mates are provided to be tooth-engaged with engine-side uppermost-stage gear mates.

An output gear of the high-stage gear mates is provided to be tooth-engaged with an input gear of engine-side uppermost-stage gear mates.

A gear shift ratio provided by the engine-side uppermost-stage gear mates is higher than a gear shift ratio provided by an input gear of the engine-side uppermost-stage gear mates and an output gear of the high-stage gear mates.

The second control device of the second transmission mechanism may include a low-stage control device connecting the low-stage gear mates to the motor output shaft, and a high-stage control device connecting the high-stage gear mates to the motor output shaft, wherein as the shifting rail connected to the second control device is moved to the neutral position or the shifting position, the low-stage control device and the high-stage control device mutually interlock with each other to be slid.

A parking gear is provided on the motor output shaft.

A motor generator is connected to the engine output shaft connected to the engine to normally generate electricity using the power provided from the engine.

A reverse gear is provided to be rotatable relative to the motor input shaft, a reverse control device is provided to selectively fasten the reverse gear to the motor input shaft, and the reverse gear is provided to be tooth-engaged with an input gear of any one of the engine-side gear mates.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF SPECIFIC EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A power train for a hybrid vehicle in accordance with the present invention is briefly configured to include a first transmission mechanism 100 and a second transmission mechanism 200.

Referring to FIGS. 2 to 7, the first transmission mechanism 100 serves to transfer a power of an engine 110 to a drive shaft 300 through gear shifting to suit the traveling state of the vehicle.

Figure 2:
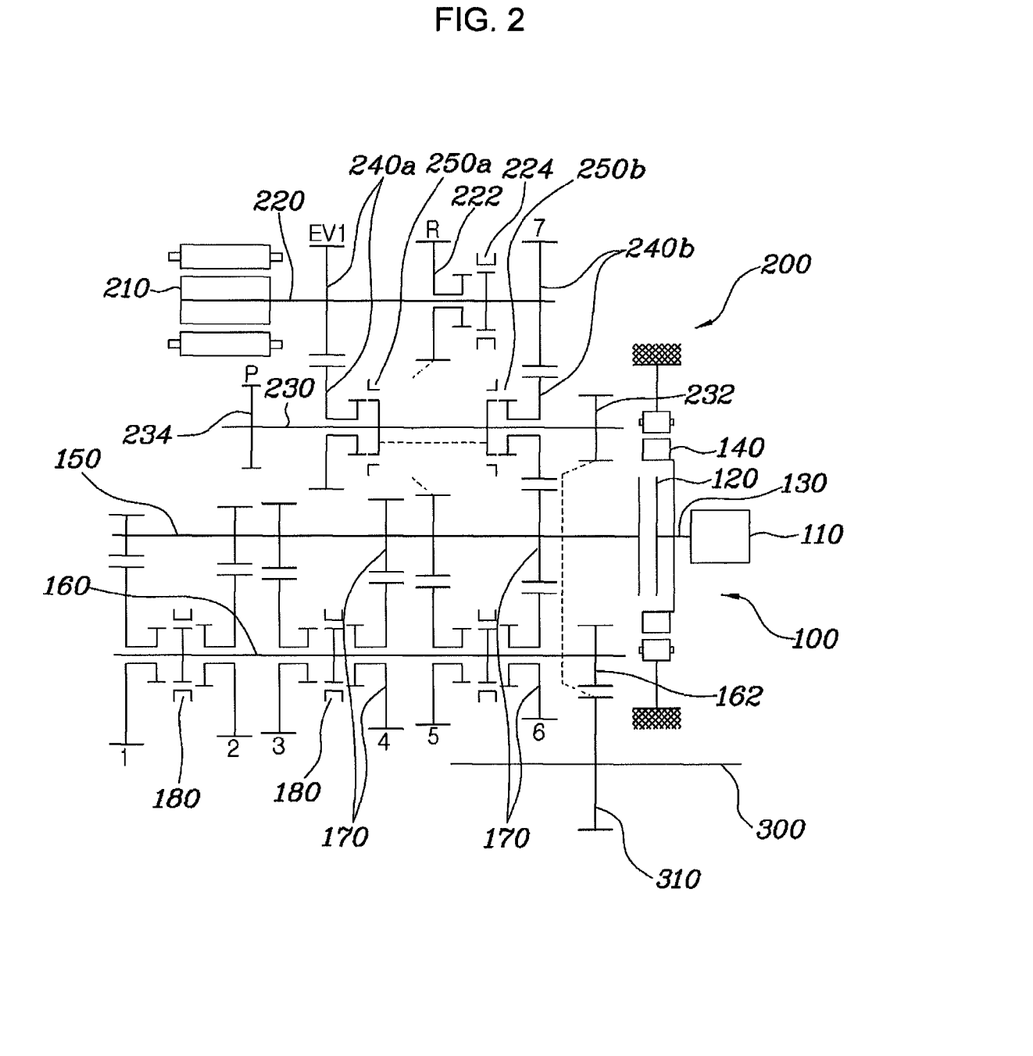
FIG. 2 is a diagram explaining entire layout configuration of a power train for a hybrid vehicle in accordance with the present invention.

For example, a clutch 120 is arranged between an engine output shaft 130 and a transmission input shaft 150 so that the power of the engine 110 can be selectively input thereto.

Further, the transmission input shaft 150 is provided to be rotated through reception of the power from the engine 110, and a transmission output shaft 160 is arranged in parallel to the transmission input shaft 150.

Further, on the transmission input shaft 150 and the transmission output shaft 160, a plurality of engine-side gear mates 170 having different gear shift ratios are provided to be tooth-engaged with each other, and among the plurality of engine-side gear mates, the engine-side gear mates 170 that meets a traveling speed is selected by a control device 180. Accordingly, the power that is provided from the engine 110 is transferred to the drive shaft 300 through the transmission input shaft 150 and the transmission output shaft 160.

Here, the engine-side gear mates 170 may form a forward sixth-stage gear shift stage, and the control device 180 may be arranged between two gear mates to form two gear shift stages according to a movement direction. In this case, it is preferable that a synchro-mesh type control device is used as the above-described control device 180.

Further, a first final reduction pinion 162 is provided on the transmission output shaft 160, and the first final reduction pinion 162 is tooth-engaged with a ring gear 310 of the drive shaft 300.

Next, the second transmission mechanism 200 serves to transfer a power of a motor 210 to the drive shaft 300 through gear shifting to suit the traveling state and the traveling mode of the vehicle.

For example, the power of the motor 210 is input, and among a plurality of motor-side gear mates having different gear shift ratios, a motor-side gear mates that suits the traveling state and the traveling mode is selected by a control device. Accordingly, the powers provided from the engine 110 and the motor 210 are transferred to the drive shaft 300 through gear shifting.

More specifically, a motor input shaft 220 is arranged to be rotated through reception of the power of the motor 210, and the motor output shaft 230 is arranged in parallel to the motor input shaft 220.

Further, low-stage gear mates 240a and high-stage gear mates 240b having different gear shift ratio are provided to be tooth-engaged with the motor input shaft 220 and the motor output shaft 230, and the control device 250 selectively connects the low-stage gear mates 240a or the high-stage gear mates 240b to the motor output shaft 230 to transfer the power to the drive shaft 300.

Here, it is preferable that a dog clutch is used as the control device 250. However, other known control devices, such as synchro-mesh type control devices, may also be used.

Figure 3:
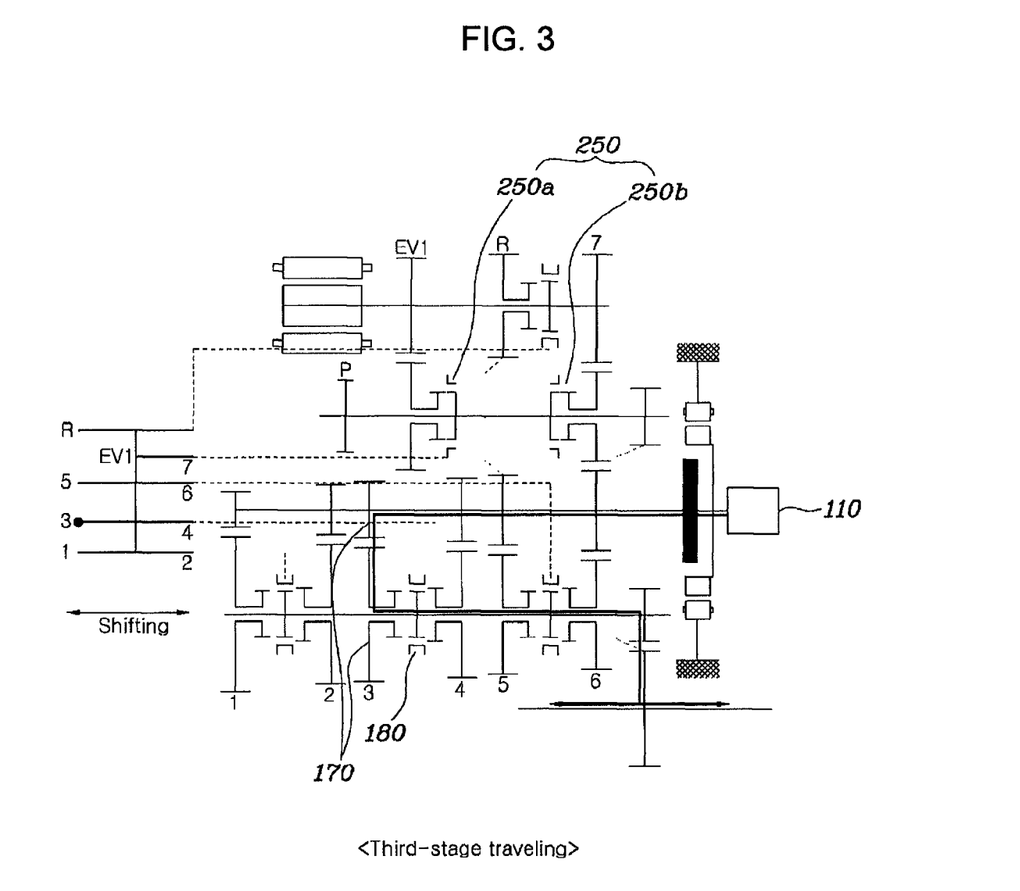
FIG. 3, FIG. 4, and FIG. 5 are diagrams exemplifying a power flow when gear shift from the third stage to the fourth stage is performed by a power train for a hybrid vehicle in accordance with the present invention.
Figure 4:
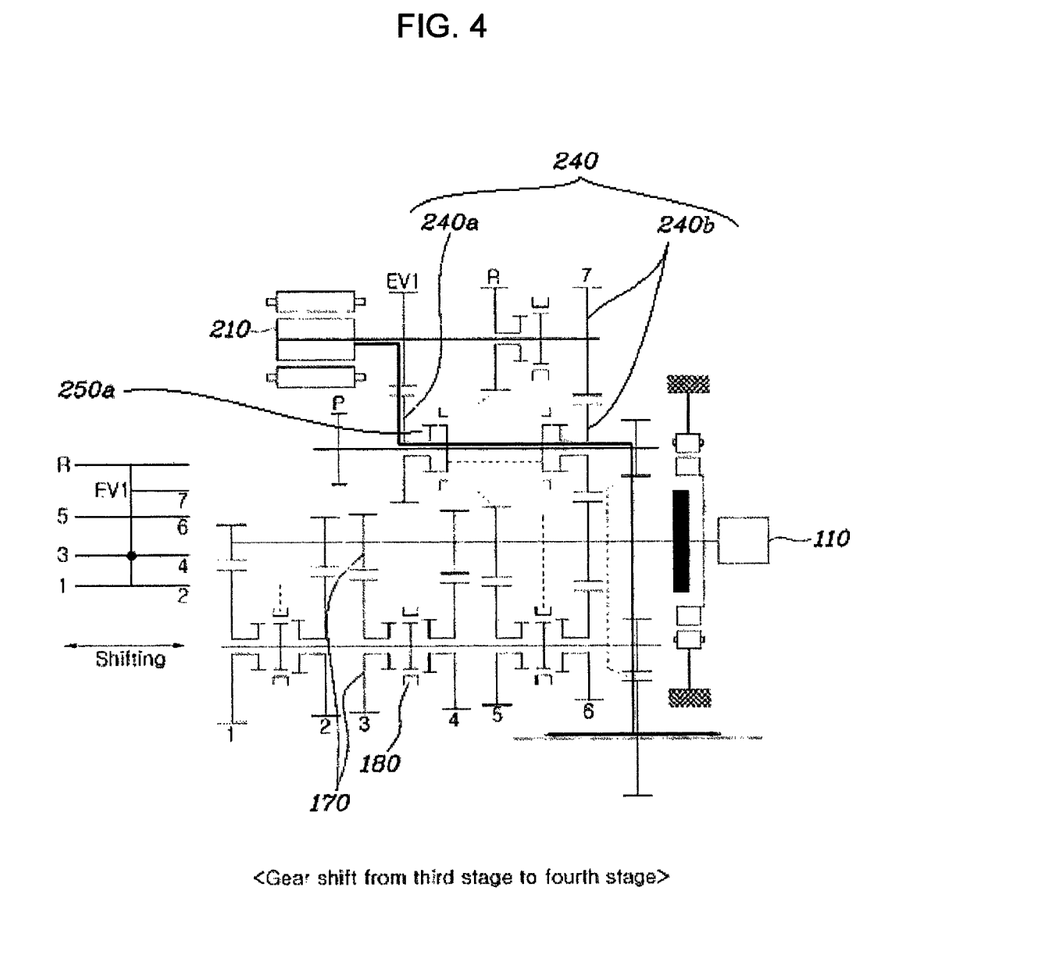
Figure 5:
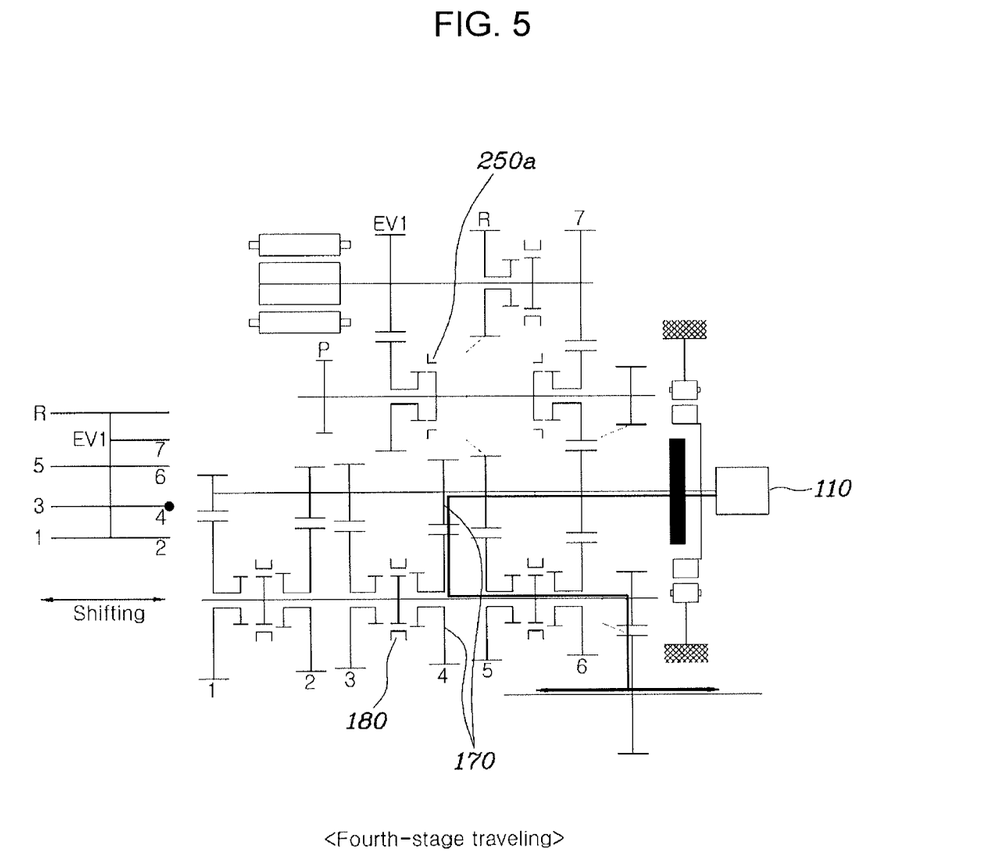

In particular, as shown in FIGS. 3 to 5, the control device 250 of the second transmission mechanism 200 is configured to maintain one of the motor-side gear mates in a normally connected to the motor output shaft 230 during traveling of the vehicle.

For example, a plurality of shifting rails are arranged to form a gear shift stage through selecting and shifting of corresponding gear mates through shifting movement of the control device 180 and 250.

In particular, the shifting rail for shifting movement of the control device 250 of the second transmission mechanism 200 is configured to make one of the motor-side gear mates are normally connected to the motor output shaft 230 in a neutral position of the shifting rail, and deterioration of the gear shift quality due to torque discontinuity is prevented from occurring in the gear shift process using a manual transmission mechanism.

Preferably, the motor-side gear mates 240 that is fastened by the control device 250 in the neutral position of the shifting rail may be the low-stage gear mates 240a.

Here, a second final reduction pinion 232 is rotatably provided on the motor output shaft 230, and the second final reduction pinion 232 is provided to be tooth-engaged with the ring gear 310 of the drive shaft 300.

That is, as illustrated, the control devices 180 and 250 for forming first and second stages, third and fourth stages, and fifth and sixth stages on the side of the first transmission mechanism 100, and EV1 and EV2 stages on the side of the second transmission mechanism 200 may be individually provided, and the shift rail is individually provided for shifting movement of the control devices 180 and 250 in the axis direction.

If the control devices 180 and 250 are moved in the axis direction on both sides together with the shifting rail, the corresponding gear mates are shifted by the control device 180 and 250 to form a desired gear shift stage, whereas if the shifting rail is not moved in any one of both shaft directions, the corresponding gear mates are put in the neutral position.

Referring to above-described configuration, if the shifting rail for shifting the control device 250 of the second transmission mechanism 200 is put in the central position, one of the motor-side gear mates 240 is maintained in normally connected to the motor output shaft 300, and thus the torque of the motor 210 is provided using the power of the motor 210 when the clutch 120 is disengaged in the gear shift process using the manual transmission mechanism, so that the torque discontinuity during the gear shifting can be prevented to improve the gear shift quality.

Further, even in the case where the control device 180 of the first transmission mechanism 100 is fastened to the corresponding engine-side gear mates 170 to travel through a specific gear shift stage, one of the motor-side gear mates 240 is maintained in normally fastened state, and thus the travel can be performed in HEV mode.

Here, the motor 210 may be directly connected to the motor input shaft 220.

Accordingly, when the power of the motor 210 is provided to the drive shaft 300, a separate control, such as clutch control, becomes unnecessary, and thus the device and the control can be simplified.

Figure 6:
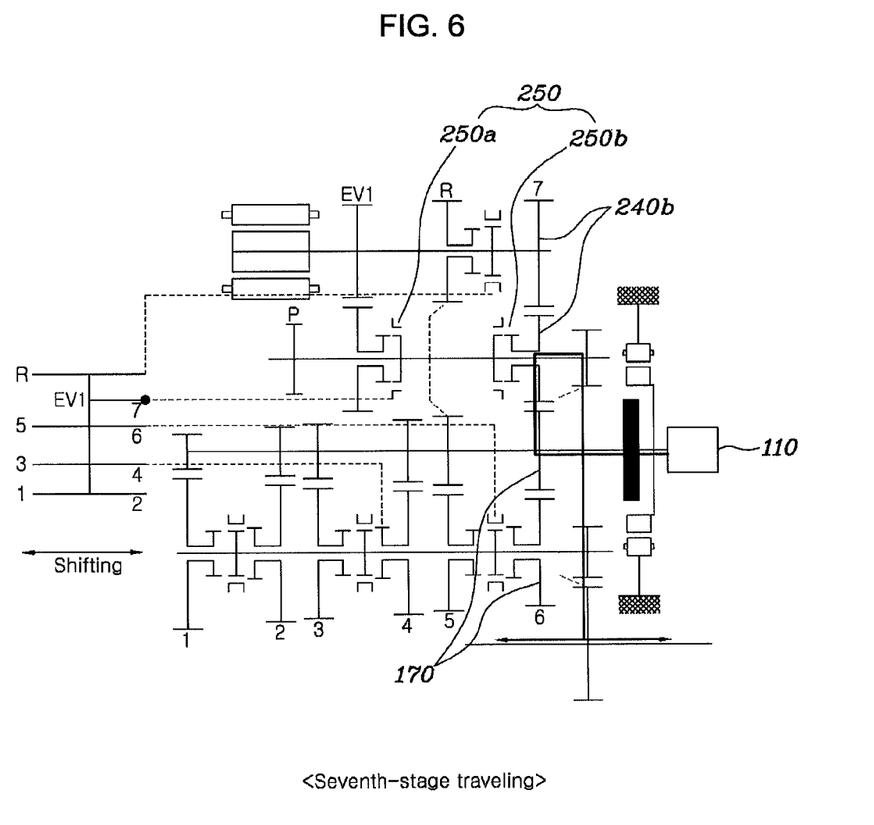
FIG. 6 is a diagram illustrating a power flow in seventh engine stage by a power train for a hybrid vehicle in accordance with the present invention.

On the other hand, as shown in FIG. 6, in accordance with the present invention, if the shifting rail that is connected to the control device 250 of the second transmission mechanism 200 is shifted from the neutral position to a shifting position on one side, the low-stage gear mates 240a may be disconnected from the motor output shaft 300 by the control device 250, and the high-stage gear mates 240b may be connected to the motor output shaft 300.

Preferably, the high-stage gear mates 240b may be provided to be tooth-engaged with the engine-side uppermost stage gear mates, and the output gear of the high-stage gear mates 240b and the input gear of the engine-side uppermost gear mates may be provided to be tooth-engaged with each other.

For example, if the uppermost stage of the engine-side gear mates 170 is the sixth stage gear mates, the input gear that forms the sixth stage gear mates and the output gear of the high-stage gear mates 240b are configured to be tooth-engaged with each other.

In particular, the gear shift ratio that is formed by the engine-side uppermost stage gear mates may be higher than the gear shift ratio that is formed by the input gear of the engine-side uppermost stage gear mates and the output gear of the high-stage gear mates 240b.

Through the above-described configuration, since the seventh stage gear shift ratio of the engine 110 is implemented using the sixth stage input gear of the first transmission mechanism 100 and the high-stage output gear of the second transmission mechanism 200, the power transfer efficiency is improved to help the reduction of the fuel efficiency.

The control device 250 of the second transmission mechanism 200 may be configured to include a low-stage control device 250a connecting the low-stage gear mates 240a to the motor output shaft 230, and a high-stage control device 250b connecting the high-stage gear mates 240b to the motor output shaft 230.

As the shifting rail connected to the control device 250 is moved to the neutral position or the shifting position, the low-stage control device 250a and the high-stage control device 250b mutually interlock with each other to be slid.

That is, if the shifting rail connected to the control device 250 is in the neutral position, the low-stage control device 250a connects the low-stage gear mates 240a to the motor output shaft 230, and the high-stage control device 250b disconnects the high-stage gear mates 240b from the motor output shaft 230.

In contrast, if the shifting rail connected to the control device 250 is in the shifting position on one side, the low-stage control device 250a disconnects the low-stage gear mates 240a from the motor output shaft 230, and the high-stage control device 250b connects the high-stage gear mates 240b to the motor output shaft 230.

In addition, as shown in FIG. 2, a parking gear 234 may be provided on the motor output shaft 230. As an example, the rotation of the parking gear 234 can be selectively fixed using a parking sprag.

In accordance with the present invention, since the motor 210 is directly connected to the motor input shaft 220, a separate motor generator 140 may be installed for idle charge.

That is, the motor generator 140 may be connected to the engine output shaft 130 connected to the engine 110 so as to perform normal generation using the power provided from the engine 110.

For example, as illustrated, a thin motor generator 140 may be provided between the engine 110 and the clutch 120, or HSG may be directly connected to the engine output shaft 130 using a belt.

Figure 7:
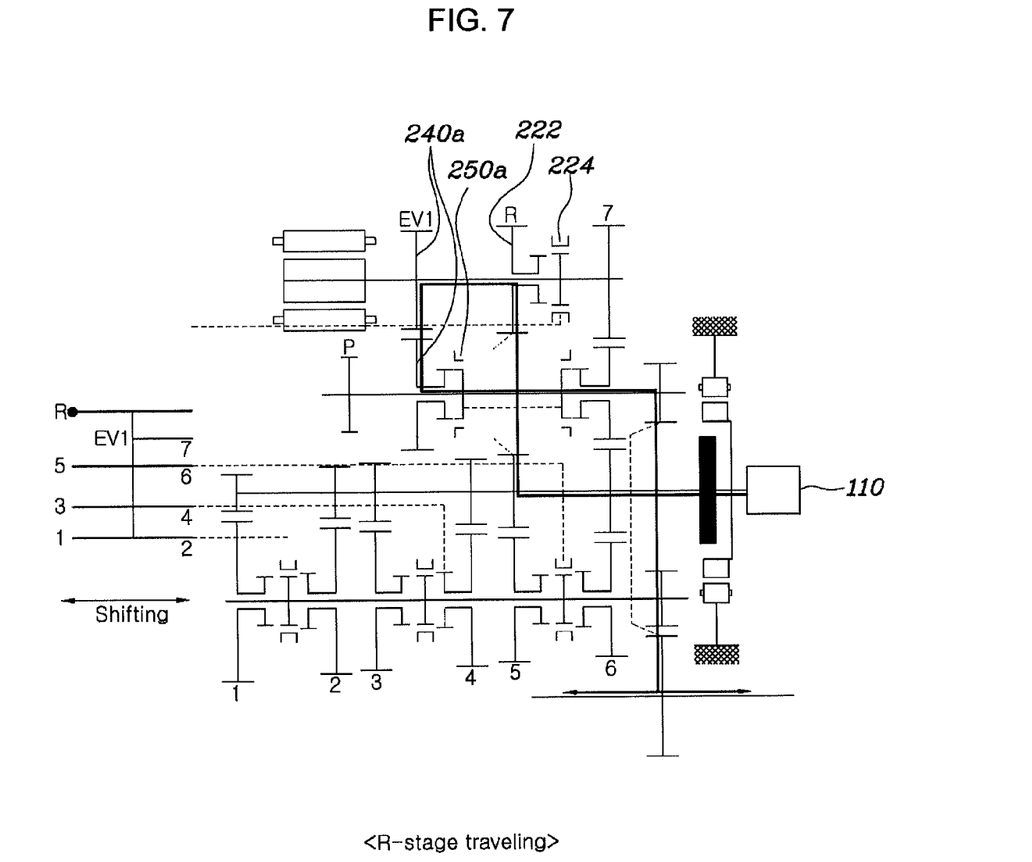
FIG. 7 is a diagram illustrating a power flow in R stage by a power train for a hybrid vehicle in accordance with the present invention.

On the other hand, as shown in FIG. 7, a reverse gear 222 may be provided to be rotatable relative to the motor input shaft 220, and a reverse control device 224 may be provided to selectively connect the reverse gear 222 to the motor input shaft 220. In this case, the reverse gear 222 may be provided to be tooth-engaged with the input gear of any one of the engine-side gear mates 170.

Further, in order to form a reverse stage, the reverse control device 224 may be configured to be shifted by the corresponding shifting rail.

Figure 8:
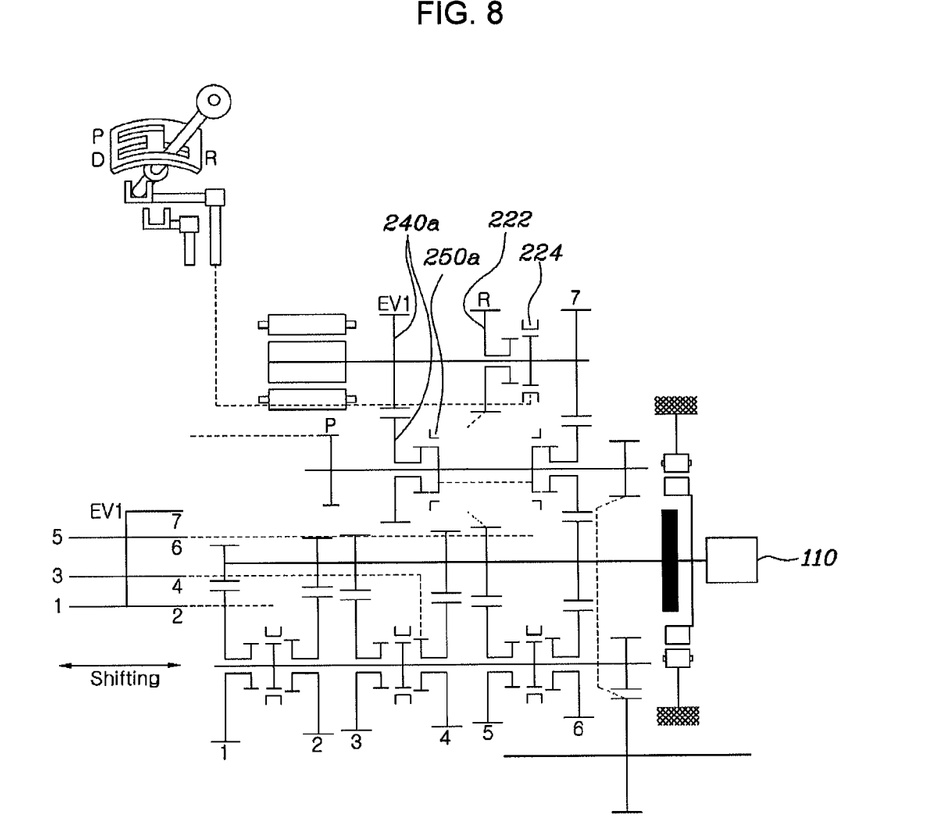
FIG. 8 is a diagram explaining a configuration in which a control device for forming an R stage is directly connected to a gear lever in accordance with the present invention.

In addition, as illustrated in FIG. 8, in the case of the reverse stage, a wire (rod) may be connected to a gear lever, and the gear lever and the wire may be directly operated by driver's reverse stage operation to form the reverse stage. In this case, the same operation number of shifters/selectors as that of the existing sixth stage AMT can be provided, and thus the seventh stage AMT can be configured without additional cost.

Hereinafter, a power transfer flow will be described exemplifying a partial traveling mode in accordance with the present invention will be described.

FIGS. 3 to 5 exemplify the power flow when the gear shift from the third stage to the fourth stage is performed by the power train for a hybrid vehicle in accordance with the present invention.

Referring to the drawings, at 3-speed of the engine 110, the power that is provided from the engine 110 is shifted through the engine-side third-stage gear mates to be transferred to the drive shaft 300, and thus 3-speed of the engine 110 can be implemented. In this case, although not indicated in the drawings, the power of the motor 210 is also provided through the motor-side low-stage gear mates 240a, and it becomes possible to perform traveling in the HEV mode.

Then, during the gear shifting from the third stage to the fourth stage, the power of the motor 210 is provided through the low-stage gear mates 240a at a moment when the power provided from the engine 110 is disconnected by the clutch 120, and thus deterioration of the gear shift quality due to the torque stage reduction that occurs in the gear shift process can be prevented.

Further, although not illustrated in the drawings, in a state where only the motor-side control device 250 is fastened to the motor-side gear mates, EV1 stage or EV2 stage traveling mode can be implemented.

FIG. 6 is a diagram illustrating a power flow in seventh engine stage by a power train for a hybrid vehicle in accordance with the present invention.

Referring to the drawing, the power provided from the engine 110 is transferred to the drive shaft 300 through the engine-side sixth-stage input gear and the motor-side high-end output gear. Accordingly, implementation of the 7-speed of the engine 110 becomes possible. Moreover, it is possible to add the power provided from the motor 210 to the power from the engine 110 through the motor-side high-stage gear mates 240b of the motor-side gear mates 240, so that the 7-speed of HEV mode is implemented.

FIG. 7 is a diagram illustrating a power flow in R stage by a power train for a hybrid vehicle in accordance with the present invention.

Referring to the drawing, in the R stage, the reverse control device 224 is fastened and the motor-side low-stage gear mates 240a is connected to the motor output shaft 230, and thus the power provided from the engine 110 is transferred to the drive shaft 300 through the reverse gear 222 and the low-stage gear mates 240a to implement the reverse stage.

According to an exemplary embodiment of the present invention as described above, in the case where the shifting rail for shifting the control device of the second transmission mechanism is in the neutral position, one of the motor-side gear mates is maintained in normally fastened state, and thus the motor torque is provided to the drive shaft using the power of the motor when the clutch is disengaged in the gear shift process using the manual transmission mechanism. Accordingly, deterioration of the gear shift quality due to torque discontinuity is prevented from occurring during the gear shifting and thus the gear shift quality can be improved.

Further, since the seventh stage gear shift ratio of the engine is implemented using the sixth stage input gear of the first transmission mechanism and the high-stage output gear of the second transmission mechanism, the power transfer efficiency is improved and thus the fuel efficiency can also be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
    a first transmission mechanism receiving a selective input of a power of an engine, and gear-shifting and transferring the power provided from the engine to a drive shaft through selection of engine-side gear mates that meet a traveling speed among a plurality of engine-side gear mates having different gear ratios through a first control device; and
    a second transmission mechanism receiving an input of a power of a motor, and gear-shifting and transferring the powers provided from the engine and the motor to the drive shaft through selection of a motor-side gear mates that meet a traveling mode or the traveling speed among a plurality of motor-side gear mates having different gear ratios through a second control device,
    wherein the second control device of the second transmission mechanism maintains at least one of the motor-side gear mates in a normally connected state to the drive shaft to transfer the power of the motor in all gear shift stages during traveling of the hybrid vehicle.

2. The power train of claim 1, wherein a plurality of shifting rails are arranged to form a gear shift stage through selecting and shifting of corresponding gear mates through shifting movement of the first and second control devices, and a shifting rail for shifting movement of the second control device of the second transmission mechanism is configured to make one of the motor-side gear mates to be normally connected to the drive shaft in a neutral position of the shifting rail.

3. The power train of claim 2, wherein the second transmission mechanism comprises:
    a motor input shaft rotating by the power of the motor input thereto;
    a motor output shaft arranged in parallel to the motor input shaft; and
    the motor-side gear mates comprising low-stage gear mates and high-stage gear mates provided to be tooth-engaged with the motor input shaft and the motor output shaft with the different gear ratios, wherein the second control device selectively connects the low-stage gear mates or the high-stage gear mates to the drive shaft to transfer the power of the motor, and wherein the motor-side gear mates are connected to the drive shaft through the motor output shaft, and the motor-side mates that are connected to the motor output shaft by the second control device in the neutral position of the shifting rail are the low-stage gear mates.

4. The power train of claim 3, wherein the motor is directly connected to the motor input shaft.

5. The power train of claim 3, wherein a second final reduction pinion is provided on the motor output shaft, and the second final reduction pinion is provided to be tooth-engaged with a ring gear of the drive shaft.

6. The power train of claim 3, wherein when the shifting rail connected to the second control device of the second transmission mechanism is moved from the neutral position to a shifting position on a side, the low-stage gear mates are disconnected from the motor output shaft, and the high-stage gear mates are connected to the motor output shaft by the second control device.

7. The power train of claim 6, wherein the high-stage gear mates are provided to be tooth-engaged with engine-side uppermost-stage gear mates.

8. The power train of claim 7, wherein an output gear of the high-stage gear mates is provided to be tooth-engaged with an input gear of engine-side uppermost-stage gear mates.

9. The power train of claim 8, wherein a gear shift ratio provided by the engine-side uppermost-stage gear mates is higher than a gear shift ratio provided by an input gear of the engine-side uppermost-stage gear mates and an output gear of the high-stage gear mates.

10. The power train of claim 6, wherein the second control device of the second transmission mechanism comprises:

a low-stage control device connecting the low-stage gear mates to the motor output shaft; and a high-stage control device connecting the high-stage gear mates to the motor output shaft, wherein as the shifting rail connected to the second control device is moved to the neutral position or the shifting position, the low-stage control device and the high-stage control device mutually interlock with each other to be slid.

11. The power train of claim 3, wherein a parking gear is provided on the motor output shaft.

12. The power train of claim 3, wherein a motor generator is connected to the engine output shaft connected to the engine to normally generate electricity using the power provided from the engine.

13. The power train of claim 3, wherein a reverse gear is provided to be rotatable relative to the motor input shaft, a reverse control device is provided to selectively fasten the reverse gear to the motor input shaft, and the reverse gear is provided to be tooth-engaged with an input gear of any one of the engine-side gear mates.

* * * * *